United States Patent [19]

Tomizawa et al.

[11] Patent Number: 4,500,921
[45] Date of Patent: Feb. 19, 1985

[54] AGC ARRANGEMENT FOR A TELEVISION SYSTEM

[75] Inventors: Akimori Tomizawa; Hiroshi Osaka, both of Tokyo, Japan

[73] Assignee: Clarion Co., Ltd., Tokyo, Japan

[21] Appl. No.: 400,195

[22] Filed: Jul. 20, 1982

[30] Foreign Application Priority Data

Jul. 23, 1981 [JP] Japan .............................. 56-115505

[51] Int. Cl.³ .............................................. H04N 5/52
[52] U.S. Cl. .................................................... 358/174
[58] Field of Search ............... 358/174, 144, 189, 123, 358/175, 323; 455/70, 237, 68, 72; 330/52; 333/17 L; 370/24

[56] References Cited

U.S. PATENT DOCUMENTS 4,148,068  4/1979  Hofmann .............................. 358/174
4,234,892  11/1980  Mochizuki et al. .................. 358/174

Primary Examiner—Tommy P. Chin
Assistant Examiner—Michael D. Parker
Attorney, Agent, or Firm—Flynn, Thiel, Boutell & Tanis

[57] ABSTRACT

A television system includes a transmitting station transmits a TV signal after adding a pilot carrier having a frequency within the video signal band to the video signal and includes a receiver which selectively takes out the pilot carrier by means of a bandpass filter and uses the pilot carrier as an AGC reference signal.

3 Claims, 8 Drawing Figures

AGC ARRANGEMENT FOR A TELEVISION SYSTEM

BACKGROUND OF THE INVENTION

1. Field of the Invention

This invention relates to a TV system capable of inserting a pilot carrier to be used as an AGC reference signal in a TV signal and easily taking it out, and more particularly to an improvement of an AGC system for such a television system.

2. Description of the Prior Art

Today, to transmit a TV signal, an optical signal changeable in response to brightness of the picture to be reproduced is first converted to an electric signal (video signal), and a complex video signal made by superposing sync signal B to video signal A as shown in FIG. 1 is actually transmitted. Further, upon transmission, the carrier amplitude is modulated by the complex video signal (hereinafter simply called "video signal"). There are several modulating methods as shown in FIGS. 2 through 4. FIG. 2 shows a so-called negative modulating method wherein the carrier amplitude becomes maximum at the sync signal portion B of the video signal A and minimum at the largest point a (white level) of the video signal A. This is characterized in that the signal power decreases at the white level portion and is widely adopted in Japan and the U.S.A. as a standard method. FIG. 3 shows a so-called positive modulating method wherein, contrary to the method of FIG. 2, the carrier amplitude becomes maximum at the white level portion a of the signal A. This is characterized in that the signal power increases at the white level portion. FIG. 4 shows a so-called sync signal suppression modulating method wherein the sync signal part B falls in the video signal A. This is similar to the method of FIG. 2 in that the signal power decreases at the white level portion.

Pay TV broadcasting permitting only special receivers to reproduce a video signal was recently realized and is now in practice utilizing the above-mentioned TV signal. Such pay TV broadcasting has such a system that the broadcasting station transmits a scrambled signal by scrambling a normal TV signal by an encoder while a subscriber in turn reproduces the given picture after decoding the scrambled TV signal by a decoder of his own.

If the broadcasting station uses a special modulating method, there is a possibility that receivers cannot decode the modulated TV signal nor reproduce the picture. For example, when the broadcasting station transmits a TV signal modulated according to the positive modulating method of FIG. 3 or the sync signal suppression method of FIG. 4, a receiver designed to receive only a TV signal modulated according to the negative modulating method of FIG. 2 cannot properly separate the sync signal, whereby it is impossible to reproduce a normal picture. That is, said purpose for transmitting a signal in secrecy is thus attained.

Now think about an automatic gain control (AGC) function for keeping a signal level always constant in a receiver's system regardless of variation of the received signal input level. Since the negative modulating method keeps sync signal level always constant regardless of video signal level, it makes it possible to easily perform a peak AGC function by detecting peaks of the signal. On the other hand, the positive modulating method or the sync signal suppression modulating method does not permit a peak AGC function because the peaks always vary in response to the video signal level. In this connection, when using the sync signal suppression modulating method, average AGC or manual AGC is adopted. However, neither can realize a satisfying effect.

Beside these, there is a further AGC method, namely, a pilot carrier insertion method which is adopted in the field of microcommunication. FIG. 5 is a spectrum graph of a TV signal band obtained when adopting this AGC method in dealing with a TV signal. The abscissa represents frequency and the ordinate represents signal level. Reference numeral 1 designates a band of a modulated video signal, and 2 is a pilot carrier. According to this, the transmitting station inserts the pilot carrier 2 with a determined frequency adjacent to the video signal band regardless of the waveform of the video signal, while the receiver's system takes out the pilot carrier 2 by means of a bandpass filter. Thus, the pilot carrier is utilized as an AGC reference signal.

However, this method causes an increase of the TV signal band because the pilot signal 2 must be inserted outside the band 1 of the video signal as shown in FIG. 5 in order to avoid interference between the pilot carrier and the video signal. For example, according to NTSC, the bandwidth for a TV signal should be 6 MHz, so that it is sometimes difficult to insert a pilot carrier in a TV signal having no leeway in its signal band without adversely influencing the video signal and the audio signal.

It is therefore desirable, for TV signal reception, to provide an AGC method having a stable function.

OBJECT OF THE INVENTION

Accordingly, the present invention has its object in overcoming the above-mentioned problems, by providing an AGC system so arranged as to insert a pilot carrier in its video signal band without adversely influencing the TV signal and to selectively take out the pilot carrier at the receiver for use as an AGC reference signal.

SUMMARY OF THE INVENTION

In accordance with the present invention, there is provided a television system which comprises:
 a pilot carrier generating a means for generating pilot carrier having a frequency within a video signal band;
 an adder means for adding said pilot carrier to a video signal;
 a transmitting means for transmitting a TV signal which includes said added pilot carrier;
 a means for receiving and demodulating said TV signal;
 an automatic gain control (AGC) means for extracting the pilot carrier out of said demodulated signal to obtain an AGC reference signal for said demodulator means;
and
 a means for removing said pilot carrier from said demodulated signal and thereafter supplying the demodulated signal to a later stage.

DETAILED DESCRIPTION

Figure 1:
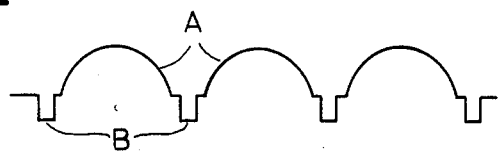
FIGS. 1 through 4 show waveforms of various conventional TV signals.
Figure 2:
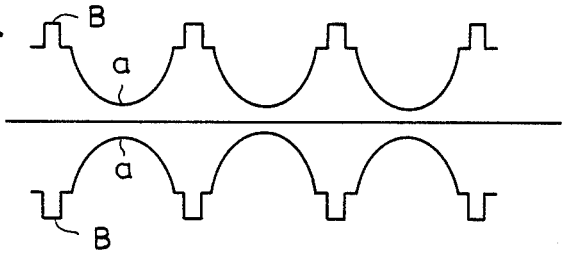
Figure 3:
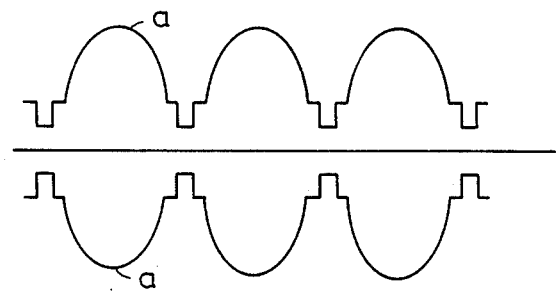
Figure 4:
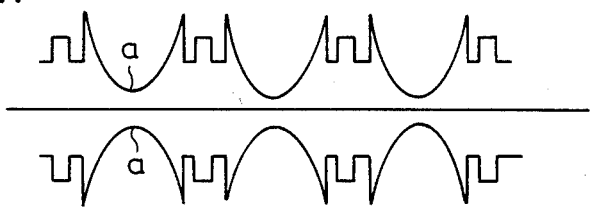
Figure 5:
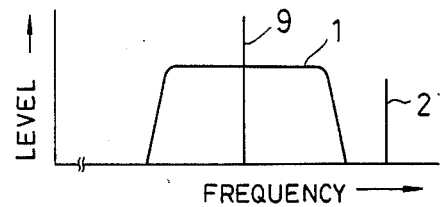
FIGS. 5 and 7 are spectrum graphs which each show a TV signal band.

The present invention will now be described in detail by way of a preferred embodiment shown in the drawings.

Figure 6:
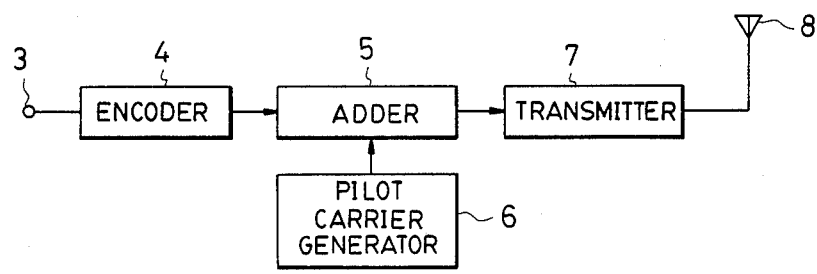
FIGS. 6 and 8 are block diagrams showing an embodiment according to the present invention.
Figure 7:
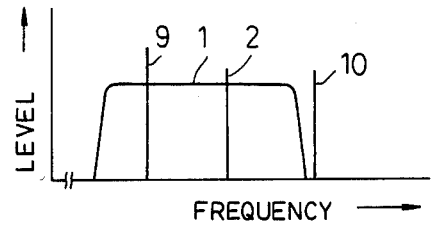

FIG. 6 is a block diagram showing an embodiment of part of a TV system according to the present invention and in particular a transmitting system. Reference numeral 3 refers to an input terminal, 4 to an encoder, 5 to an adder, 6 to a pilot carrier generator, 7 to a transmitter, and 8 to a transmission antenna, respectively. A video signal supplied to the input terminal 3 is scrambled by the encoder 4 and applied to the adder 5. The adder 5 is also supplied with a signal from the pilot carrier generator 6 and adds both signals together. The signal output from the adder 5 is modulated by the transmitter 7 and is thereafter transmitted from the antenna 8 as a TV signal. FIG. 7 is a spectrum graph showing the bandwidth 1 of the TV signal according to the present invention. Reference numeral 2 is the pilot carrier, 9 is a video signal carrier, and 10 is an audio signal carrier, respectively. As will be understood from FIG. 7, the pilot carrier 2 having a constant frequency is inserted within the video signal band.

Figure 8:
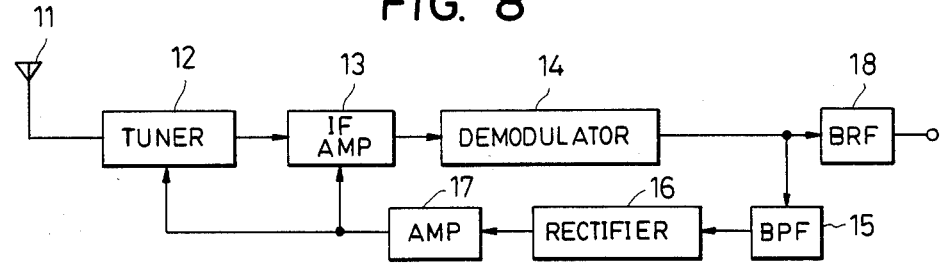

FIG. 8 is a block diagram showing a TV receiver used in the embodiment of the present invention. Reference numeral 11 refers to a reception antenna, 12 to a tuner, 13 to an intermediate frequency (IF) amplifier, 14 to a demodulator, 15 to a bandpass filter, 16 to a rectifier, 17 to an amplifier, and 18 to a band rejection filter, respectively. The TV signal received by the reception antenna 11 is converted to an intermediate frequency signal by the tuner 12, is thereafter amplified by the IF amplifier 13 and is demodulated by the demodulator 14. The demodulated signal includes the video signal, the pilot carrier and the audio signal carrier. The bandpass filter 15 takes out the pilot carrier only and applies it to the rectifier 16 to convert it to a dc signal. The dc signal, after being amplified by the amplifier 17 upto a necessary amplitude, is supplied to the tuner 12 and the IF amplifier 13 at gain control terminals thereof as an AGC reference signal. The AGC circuit is thus formed.

Since the gain control voltage in this AGC circuit depends only on the level of the pilot carrier, there is no influence to the waveform of the video signal.

The output signal from the demodulator 14 is also supplied to the band rejection filter 18, wherein only the pilot carrier is taken out. Therefore, the pilot carrier does not mix in the signal to be applied to a decoder (not shown), etc. at a later stage. In this case, a part of the video signal whose frequency is the same as that of the pilot carrier is also taken out by the band rejection filter 18. However, by determining the pilot carrier band in 1 through 3 MHz, substantial influence against the TV signal can be kept at a negligeable amount. Removal of the pilot carrier leads to prevention of adverse influence to the video signal and the audio signal in the succeeding stages of the signal processing.

As apparent from the description above, the present invention provides an AGC system so arranged as to insert a pilot carrier in a video signal band without causing any influence to the TV signal, and to selectively take out the pilot carrier at the receiver for use as an AGC reference signal. Therefore, it is possible to perform a stable AGC function.

This is particularly effective when receiving a scrambled TV signal, and in this case, secret transmission can properly be accomplished regardless of the waveform of the video signal.

The embodiments of the invention in which an exclusive property or privilege is claimed are defined as follows:

1. A television system which comprises:
    pilot carrier generating means for generating a pilot carrier having a frequency within a video signal band;
    adder means for adding said pilot carrier to a video signal which is within said video signal band;
    transmitting means for transmitting a TV signal which includes said added video signal and pilot carrier;
    means for receiving and demodulating said TV signal and for generating a demodulated signal;
    automatic gain control means for extracting said pilot carrier from said demodulated signal to obtain an AGC reference signal for said receiving and demodulating means; and
    means for removing said video signal from said demodulated signal and for thereafter supplying said video signal to a later stage.

2. A television system of claim 1 in which said automatic gain control means includes a band pass filter.

3. A television system of claim 1, wherein said automatic gain control means includes band pass filter means responsive to said demodulated signal for extracting said pilot carrier therefrom, rectifier means responsive to an output of said band pass filter means for rectifying said pilot carrier and producing therefrom a dc signal, and means in said receiving and demodulating means responsive to said dc signal for adjusting the level of said demodulated signal produced by said receiving and demodulating means.

* * * * *